United States Patent [19]
Zucca

[11] 3,722,947
[45] Mar. 27, 1973

[54] RETRACTABLE SIDE FRAME FOR FLAT BED TRAILER

[76] Inventor: Mark L. Zucca, 1608 Lafayette St., Alameda, Calif.

[22] Filed: Nov. 29, 1971

[21] Appl. No.: 202,959

[52] U.S. Cl.....................................296/26, 296/99
[51] Int. Cl. ..............................................B62d 33/08
[58] Field of Search........................296/26, 10, 7, 99

[56] References Cited

UNITED STATES PATENTS

| | | | |
|---|---|---|---|
| 3,433,470 | 3/1969 | Erke | 296/10 |
| 1,879,299 | 9/1932 | Kehl | 296/7 |
| 2,995,398 | 8/1961 | Davenport | 296/26 |
| 2,747,476 | 5/1956 | Manuel | 296/26 X |

*Primary Examiner*—Philip Goodman
*Attorney*—William R. Piper

[57] ABSTRACT

A retractable side frame for flat bed trailer in which a U-shaped frame has side members that are slidably received in channels which in turn are removably mounted adjacent to the sides of the flat bed. The U-shaped frame has telescopic legs which may be extended to contact the ground when it is desired to retract the side U-shaped side frame and thus expose the flat bed so that items can be loaded onto or removed from the flat bed along the sides thereof. A modified form of the device discloses mechanical means for retracting the side frame and another modified form shows that the U-shaped retractable side frame as well as the two channels that receive the side members of the rectractable frame can be formed in sections so that the device can be readily disassembled and stored when it is desired to use the flat bed trailer without the retractable side frame.

5 Claims, 15 Drawing Figures

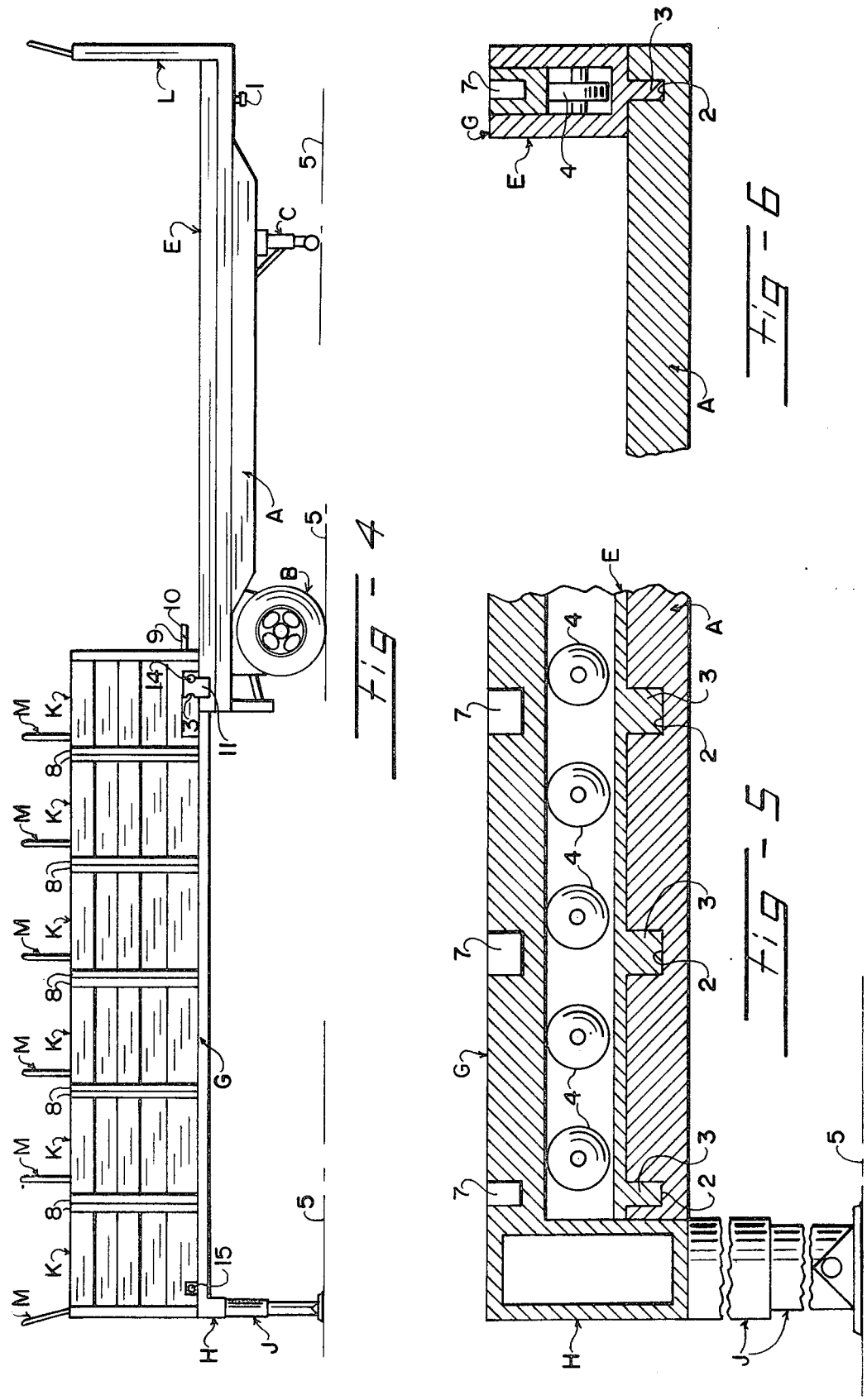

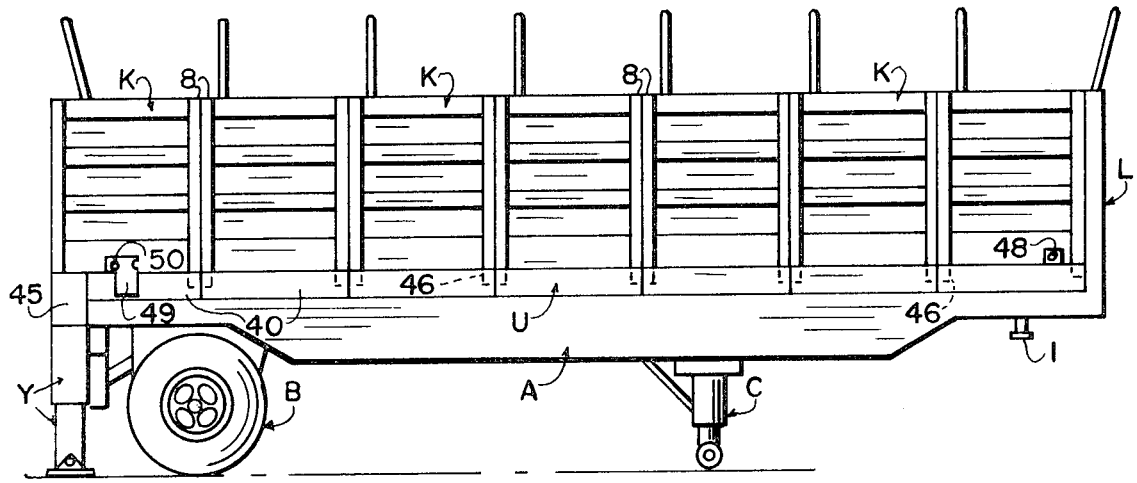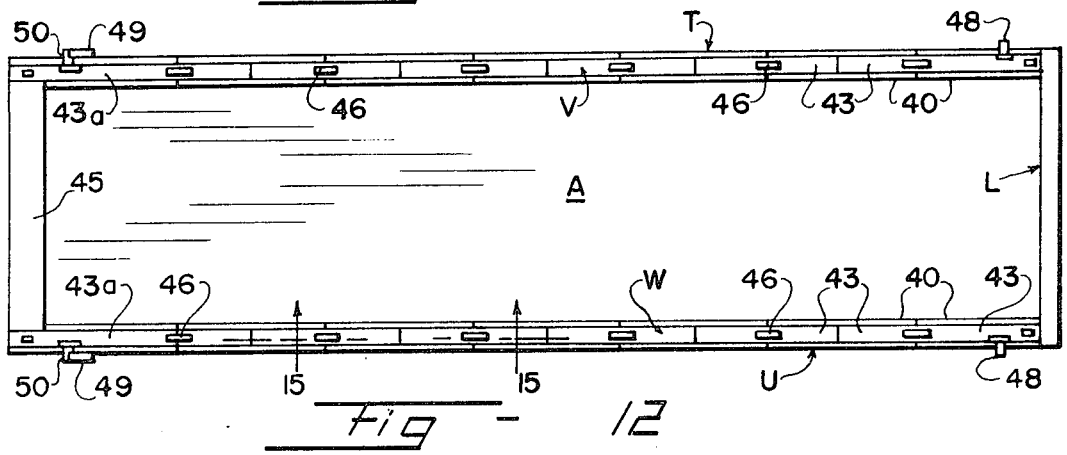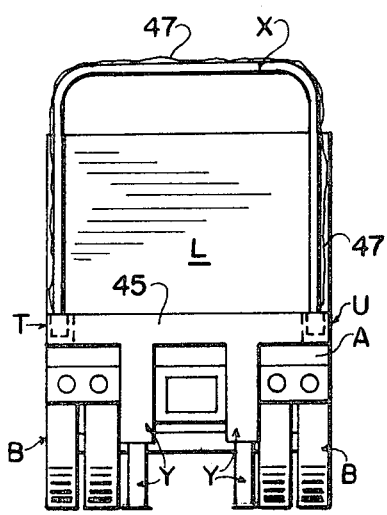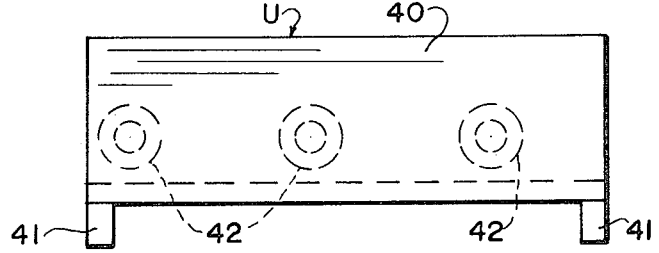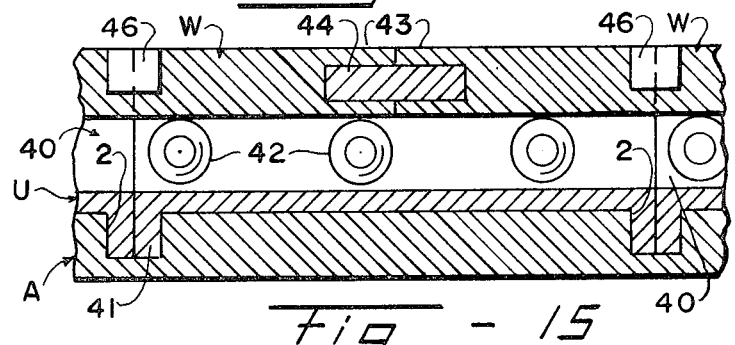

RETRACTABLE SIDE FRAME FOR FLAT BED TRAILER

CROSS-REFERENCE TO RELATED APPLICATION

In my copending application on a removable van-type cover for a flat bed trailer, filed Sept. 27, 1971, Ser. No. 183,881, now abandoned, I disclosed a van type cover that had two side walls, a top and a rear wall provided with doors. The flat bed had grooves paralleling its sides and the front of the van-type cover had rollers designed to travel in the grooves and support the front end of the cover while it was being retracted with respect to the flat bed. The rear end of the cover was supported by telescopic legs that could be extended to contact the ground for supporting the rear end of the cover in its retracted position.

BACKGROUND OF THE INVENTION

Field of the Invention

The standard flat bed has sockets disposed along each side for receiving the lower ends of stakes that are connected to the side panels. These side panels must be individually removed from the flat bed if it is desired to load an item onto the flat bed for either side thereof or to unload the item from the side of the flat bed.

I have provided a pair of side channels for the flat bed that have integral projections designed to be removably received in the flat bed sockets. A U-shaped frame has parallel side members that are slidably received in the channels and rollers are mounted in the channels for supporting the parallel side members and permit the ready retracting of the U-shaped frame with respect to the flat bed. The rear end of the retractable U-shaped frame carries extensible legs that will support the frame in its retracted position.

A modified form of my invention discloses mechanical means for retracting the side frame with respect to the flat bed. Another modified form of the device illustrates that the channels as well as the parallel side members of the U-shaped frame may be made in sections that may be readily dismantled and stored when it is desired to use the flat bed without the side panels.

SUMMARY OF THE INVENTION

An object of my invention is to provide a retractable side frame for a flat bed trailer that supports the side panels and permits them to be retracted as a unit for exposing the sides of the flat bed for the more ready loading units onto the flat bed from either side thereof or for removing units therefrom. A pair of side channels with projections that are receivable in the sockets already provided in the flat bed, are used and these channels carry rollers for supporting the U-shaped frame and permitting the frame to be moved readily into a retracted position for exposing the flat bed.

A further object of my invention is to provide mechanical means for moving the U-shaped frame into retracted position for exposing the flat bed. In another modified form the pair of said channels are composed of sections and the two side members of the U-shaped frame are also formed in sections. This permits the ready dismantling of the U-shaped frame as well as the dismantling of the two channels for storing when it is desired to use the flat bed without the side panels.

BRIEF DESCRIPTION OF THE DRAWINGS

FIG. 4 is a side elevation similar to FIG. 1, but shows the side panels and their supporting U-shaped frame in retracted position.

FIG. 5 is an enlarged longitudinal section of a portion of the device and is taken along the line 5—5 of FIG. 2.

FIG. 6 is an enlarged transverse section through a portion of the device and is taken along the line 6—6 of FIG. 2.

FIG. 11 is a side elevation of another modified form of the device.

FIG. 12 is a top plan view of FIG. 11.

FIG. 13 is a rear view of FIG. 11 and shows U-shaped members supporting a canvas instead of the side panels.

FIG. 14 is an enlarged side elevation of one of the units making up the pair of sectional arms in the U-shaped frame.

FIG. 15 is an enlarged longitudinal section through a portion of the device and is taken along the line 15—15 of FIG. 12.

DESCRIPTION OF THE PREFERRED EMBODIMENTS

Figure 1:
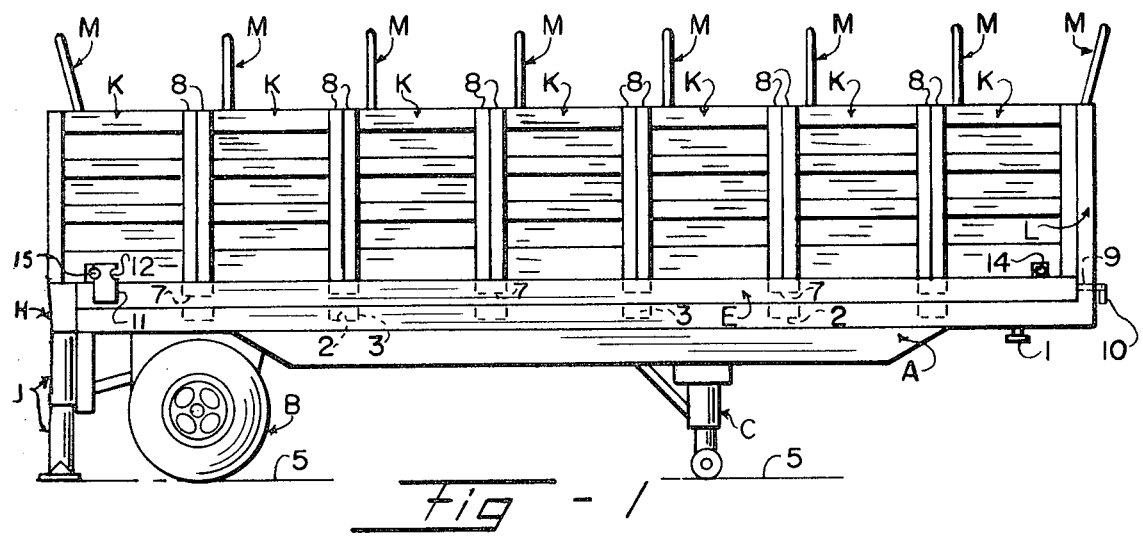
FIG. 1 is a side elevation of a flat bed trailer with my device operatively applied thereto.
Figure 2:
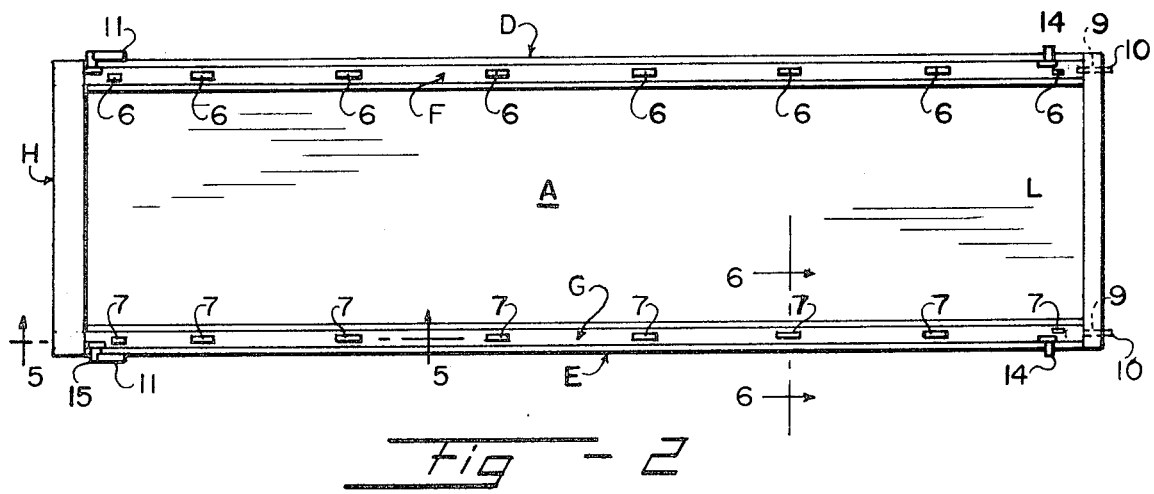
FIG. 2 is a top plan view of FIG. 1 with the side panels removed.

In carrying out my invention, I make use of a flat bed trailer indicated generally at A in FIGS. 1 and 2. The trailer is supported by two or more rear wheels B and when the front end of the trailer is not supported by a truck, not shown, it is supported by a pair of telescopic forward legs C. The usual king pin 1 is mounted at the front and on the underside of the flat bed A, and it extends downwardly therefrom. The flat bed A is provided with a row of sockets 2 along each side thereof, see FIGS. 1 and 3.

Figure 3:
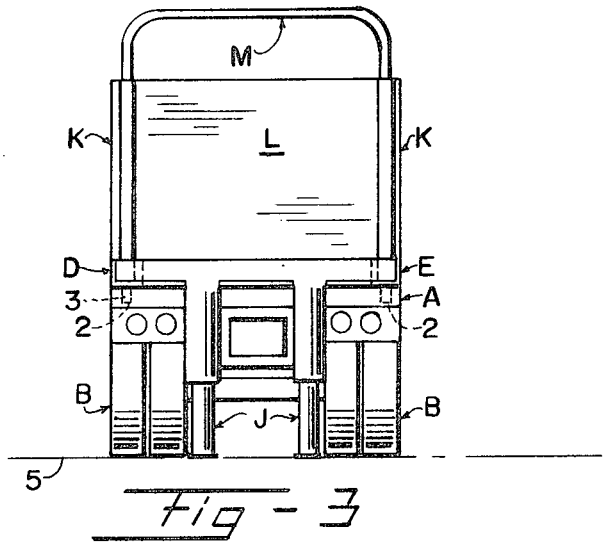
FIG. 3 is a rear elevation of FIG. 1.

I removably mount a pair of channel irons D and E along each side of the flat bed trailer A, and these channels have projections 3 that extend down into the sockets 2, see FIGS. 1, 2 and 3, and the enlarged sectional views of FIGS. 5 and 6. The channels carry a plurality of spaced apart rollers. A U-shaped frame has elongated side arms F and G, that ride in the side channels D and E, and are slidably supported by the rollers 4. These side arms F and G are interconnected by a cross piece H that extends across the rear end of the trailer. This cross piece has telescopic legs J that may be extended to contact with the ground 5, as shown in FIGS. 1, 3, 4 and 5. The side arms F and G of the U-shaped frame are provided with sockets 6 and 7, respectively, for receiving the stakes 8 of the side panels K that are carried by the side arms.

The front ends of the side arms F and G of the U-shaped frame abut the head board L of the flat bed trailer A when the frame is in operative position and is entirely supported by the rollers 4 in the side channels D and E, see FIGS. 1 and 2. Any desired means may be used for securing the U-shaped frame against accidental retraction on the flat bed A. I have shown pins 9, see FIGS. 1 and 2, that extend forwardly from the front ends of the side arms F and G and are received in registering openings in the head board L. The pins 9 have portions 10 that are pivoted to the pins and these portions are swung downwardly as shown in FIG. 1, to prevent the accidental retraction of the U-shaped frame. Both FIGS. 1 and 3 show the tops of the side panels K on both sides of the trailer being interconnected by U-shaped bars M.

In FIGS. 1, 2 and 4, I show means for stopping further retractive movement of the side arms F and G of the U-shaped frame when the frame is fully retracted with respect to the flat bed A, as shown in FIG. 4. A stop member 11 is mounted on the outer sides of the channels D and E, and near the rear ends of these channels. The stop members 11 have recesses 12 on their front edges, see FIG. 1, and recesses 13 on their rear edges, see FIG. 4. The front side panels K carry pins 14 that are received in the recesses 12 of the stops 11 when the U-shaped frame and the side panels K are in retracted position and the rear side panels K carry pins 15 that are received in the recesses 13 of the stops 11 when the U-shaped frame and the side panels are in operative position, as shown in FIG. 1. The recesses 12 and 13 when receiving the pins 14 or 15 tend to prevent any lifting movement of the side arms F and G above the side channels D and E.

In the operation of this form of the device, the telescopic legs J are extended into contact with the ground 5 by any means desired, no specific means being illustrated. Such extensible and retractable means for operating the telescopic legs J could be done mechanically, hydraulically or by compressed air. When the telescopic legs are extended as shown in FIG. 1, the tractor, not shown, is connected to the king pin 1 and the hinged portions 10 of the pins 9 are swung into alignment with the pins. The tractor is now moved forwardly to move the flat bed A forwardly while the side arms F and G and the cross piece H of the U-shaped frame remain stationary. This forward movement of the flat bed is continued until the pins 14 on the front panels K are received in the recesses 12 of the stops 11, as shown in FIG. 4, whereupon further forward movement of the flat bed A is stopped.

The flat bed A may now have items loaded onto it from the sides of the flat bed or have items removed therefrom. This is far more quickly accomplished than if the items had to be loaded or unloaded from the rear of the flat bed. Moreover, the side panels K do not individually have to be removed before loading or unloading items from the sides of the flat bed. After the loading and/or unloading operation is completed, the tractor, not shown, may move the flat bed rearwardly with respect to the U-shaped frame and the side panels and this movement is continued until the parts assume the position shown in FIG. 1. Then the pivoted arms 10 of the pins 9 are swung downwardly and the telescopic legs J are retracted so as to clear the ground 5, and the flat bed, with its cargo is ready to be hauled by the tractor, not shown, to whatever destination is desired.

Figure 9:
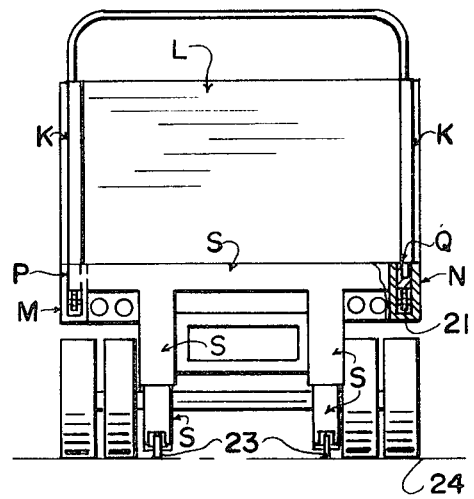
FIG. 9 is a rear elevation of FIG. 7 with a portion being shown in section.

In FIGS. 7 to 10 inclusive, I show a mechanical means for retracting the U-shaped frame with respect to the flat bed trailer A, the U-shaped frame carrying with it the side panels K, so as to expose the sides of the flat bed and permit loading and unloading from either side of the flat bed. FIG. 9 shows that the U-shaped guide channels M and N are mounted at the sides of the flat bed A, so that the upper edges of the channels will lie flush with the upper surface of the flat bed. The side arms P and Q of the U-shaped frame are slidably received in the side channels M and N, and are supported by endless chains 20 and 21, which in turn are mounted on spaced apart sprockets 22, see FIG. 10. The side arms P and Q are interconnected by a cross member R and the cross member has the telescopic legs S, which are provided with supporting wheels 23, designed to engage with the ground 24.

Figure 7:
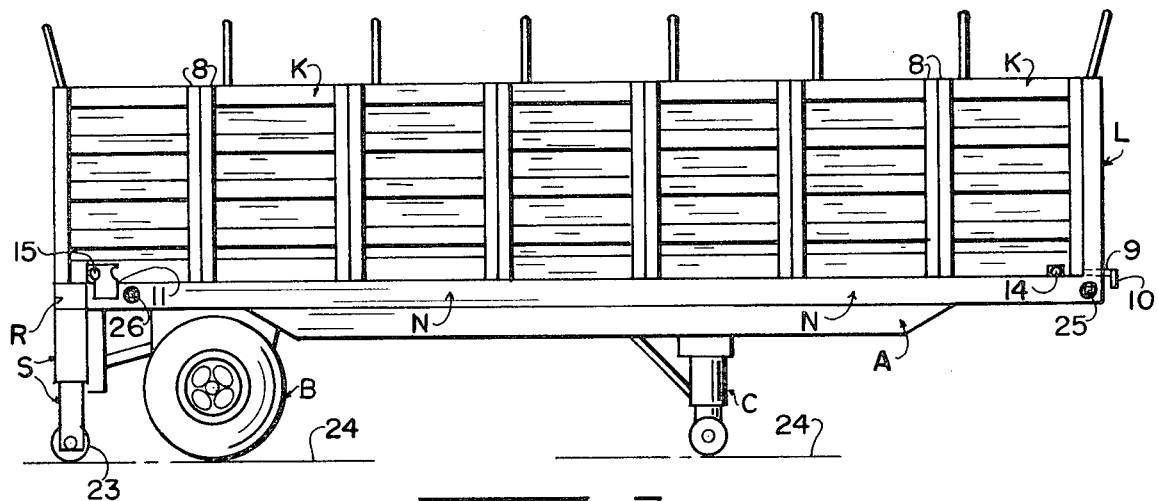
FIG. 7 is a side elevation of a modified form of my invention.
Figure 8:
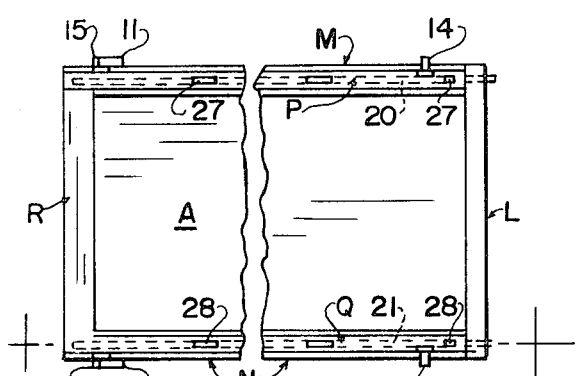
FIG. 8 is a top plan view of FIG. 7 with the side panels removed.
Figure 10:
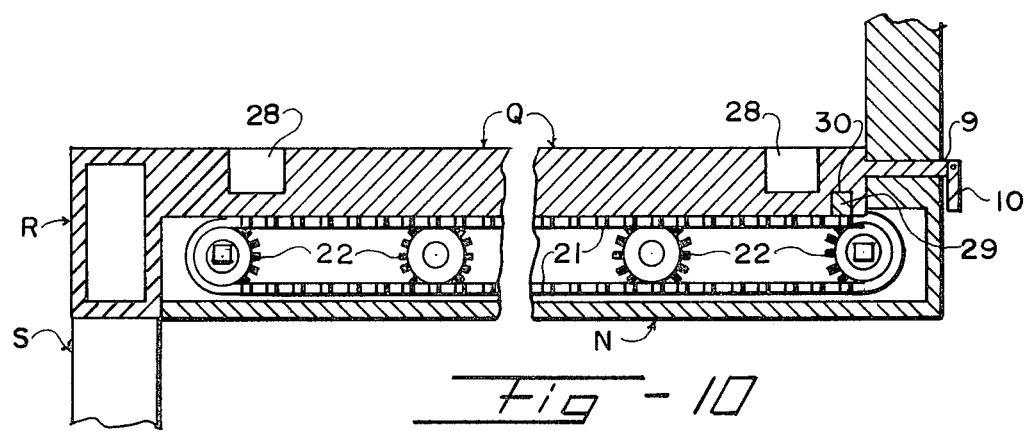
FIG. 10 is an enlarged longitudinal section and is taken along the line 10—10 of FIG. 8.

The axles for the front sprockets in the channels M and N are provided with square sockets 25 in their outer ends, see FIG. 7. In like manner, the rear sprockets in the same channels M and N are provided with square sockets 26. The operator has a hand crank, not shown, with a square projection that may be removably inserted in either front or rear socket and then the crank can be rotated for retracting the U-shaped frame and the side panels K. The panels have stakes 8 whose lower ends are removably mounted in sockets 27 in the side arm P and in sockets 28 in the side arm Q. FIG. 10 shows the endless chain 21 supporting a pin 29 that is received in a socket 30 in the side arm Q. In this manner the U-shaped frame is connected to the endless chain 21 and a rotation of either front or rear sprocket by the hand crank, not shown, will retract the U-shaped frame with respect to the flat bed trailer A. The trailer is supported by the forward telescopic legs C and rear wheels B.

When the U-shaped frame, consisting of the side arms P and Q and the rear cross member R, is to be retracted with respect to the flat bed trailer A, the pivoted portions 10 of the pins 9 are swung into alignment with the pins 9 and then the pins and portions 10 can pass through the openings in the head board L as the U-shaped frame is moved into retractive position by moving the endless chains 20 and 21, see FIGS. 7 and 10. The pins 14 on the front panels K will strike the stops 11 on the channels M and N when the U-shaped frame is entirely retracted. The extended telescopic legs S will have their wheels 23 contacting the ground 24 for supporting the rear portion of the U-shaped frame. After the loading or unloading operation is completed, the endless chains 20 and 21 can be moved for moving the U-shaped frame and its side panels K back onto the flat bed trailer and when the front side panels abut the head board L, the pins 15 will strike the stops 11. The locking pins 9 will have passed through the registering openings in the head board L, and the hinged portions 10 may be swung downwardly to prevent the accidental retraction of the U-shaped frame on the flat bed.

Another modified form of my invention is illustrated in FIGS. 11 to 15 inclusive. In this form of the device the side channels are formed into sections and the side arms of the U-shaped frame are also formed into sections. In FIGS. 11 and 12, I show the U-shaped channels T and U in sections. Then in FIG. 14, I show one of the sections 40 in side elevation and in FIG. 15, I illustrate how the integral projections 41 and received in the sockets 2 that in turn are arranged along the sides of the flat bed trailer A. Each U-shaped channel section 40 has a plurality of rollers 42, mounted therein.

I also provide a U-shaped frame that has sectional side arms V and W. An enlarged longitudinal section through two of the sections 43 illustrates how their abutting ends are provided with aligned bores that receive an interconnecting dowel 44, see FIG. 15. The rearmost sections 43a are interconnected by a cross member 45, as shown in FIGS. 12 and 13. The sectional side arms V and W have sockets 46 for receiving the lower ends of stakes 8 that are secured to the side panels K. It is possible to do away with the side panels K, and have U-shaped members X received in the sockets 46 in the sectional side arms V and W, see FIG. 13. A canvas, indicated by an irregular line 47 could be thrown over the inverted U-shaped members X, and thus protect the load on the flat bed. If the side panels K are not used for interconnecting the sections 43, then the dowels 44 would be provided with some interconnecting means, not shown, for holding the adjacent sections 43 in abutting relation when the U-shaped frame is retracted with respect to the flat bed.

The operation of this form of the device is somewhat the same as described for the form of the device shown in FIGS. 1 to 6, inclusive. The flat bed trailer A has the forward telescopic legs C, as shown in FIG. 11, and also rear wheels B. The cross member 45 has the telescopic legs Y which are similar to those shown at J, in FIGS. 1 and 3. A front stop pin 48 is carried by the front section 43 of each side arm V and W, and these pins will strike the stops 49, disposed on the outer sides of the rear channel sections 43a, when the U-shaped frame is moved into its retracted position with respect to the flat bed trailer A. The telescopic legs Y, will be extended so as to contact with the ground when the U-shaped frame consisting of the sectional side arms V and W and the rear cross member 45 is retracted.

After the loading or unloading operation, the flat bed trailer A is moved back under the U-shaped frame until the rear stop pins 50, carried by the rear sections 43a of the U-shaped frame, strike the stops 49, see FIGS. 11 and 12. Any means, not shown, may be used for securing the U-shaped frame to the head board L.

I claim:
1. In combination:
a. a flat bed trailer having parallel sides and a head board;
b. a pair of U-shaped channels substantially coextensive with the length of said flat bed;
c. means for mounting said channels along the sides of said flat bed;
c. a U-shaped frame having a pair of parallel side arms slidably received in said channels, the cross piece that interconnects the side arms extending across the rear end of said flat bed;
d. telescopic legs connected to said cross piece; and
e. side panels removably secured to said side arms, said U-shaped frame with its side panels being retractable as a unit for exposing the sides of the flat bed for loading and unloading purposes, said telescopic legs being extended to contact with the ground for supporting one end of said U-shaped frame when in its retracted position.

2. The combination as set forth in claim 1: and in which
a. rollers are mounted in said channels for slidably supporting said side arms when they are received in said channels; and
b. means for stopping further retraction of said U-shaped frame when said U-shaped frame is fully retracted so that the forward ends of said side arms will still be received in and supported by said channels and rollers.

3. The combination as set forth in claim 1: and in which
a. said flat bed has parallel sides with a row of sockets arranged along each side;
b. said channels having projections removably receivable in said sockets;
c. the side arms of said U-shaped frame having spaced apart recesses therein; and
d. said side panels having stakes removably mounted in said recesses for securing said panels to said side arms.

4. The combination as set forth in claim 1: and in which
a. said U-shaped channels are arranged along the sides of said flat bed so that the tops of the channels lie flush with the top of the flat bed;
b. an endless chain and sprockets mounted in each channel, each chain being substantially coextensive with the length of the channel;
c. the side arms of said U-shaped frame having connections with said endless chains so that a movement of said chains will extend said U-shaped frame with respect to said flat bed and expose the sides thereof for loading or unloading purposes; and
d. means for rotating at least one of said sprockets in one direction for causing said chains to extend said U-shaped frame beyond the rear end of said trailer and for rotating said sprocket in the opposite direction for retracting said U-shaped frame and moving it back into normal position.

5. The combination as set forth in claim 3: and in which
a. said side channels are formed in removable sections;
b. said U-shaped frame having its side arms formed of sections; and
c. means for removably connecting the side arm sections together.

* * * * *